No. 775,032. PATENTED NOV. 15, 1904.
H. GLADE.
FOOT CYCLE.
APPLICATION FILED DEC. 8, 1903.
NO MODEL.
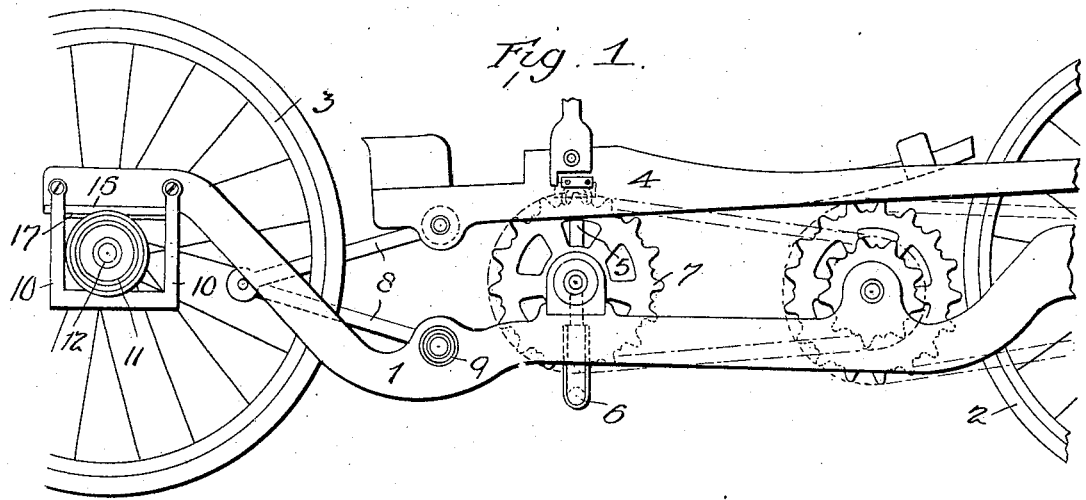
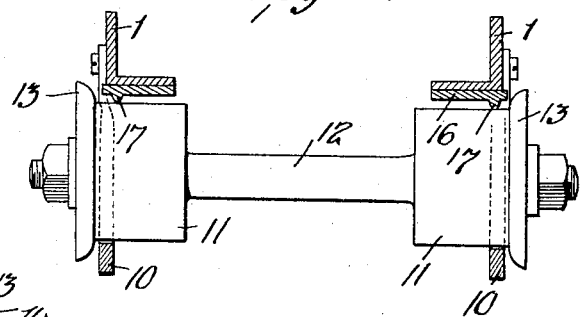
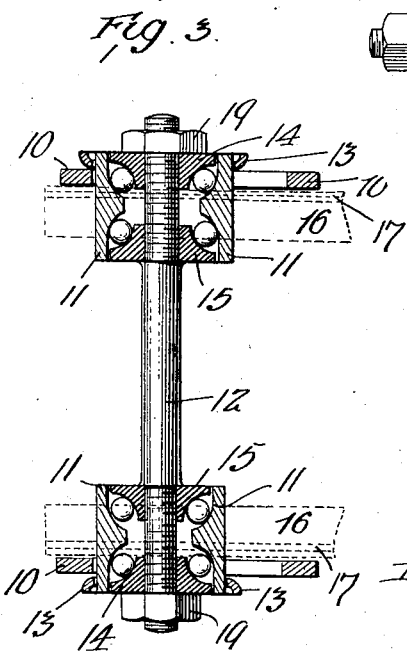
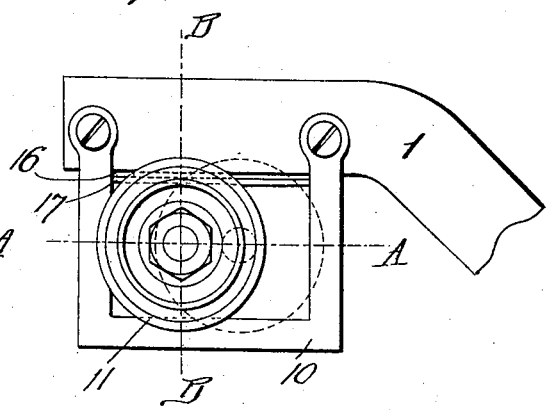
Attest:
C. S. Marleton
L. B. Middleton
Inventor
Henry Glade,
by Richards & Hu
Attys.

No. 775,032. Patented November 15, 1904.

UNITED STATES PATENT OFFICE.

HENRY GLADE, OF NORTH FITZROY, VICTORIA, AUSTRALIA.

FOOT-CYCLE.

SPECIFICATION forming part of Letters Patent No. 775,032, dated November 15, 1904.

Application filed December 8, 1903. Serial No. 184,354. (No model.)

*To all whom it may concern:*

Be it known that I, HENRY GLADE, a subject of the Emperor of Germany, residing at No. 4 Delbridge street, North Fitzroy, in the British State of Victoria, Commonwealth of Australia, have invented new and useful Improvements in Foot-Cycles, of which the following is a specification.

The present invention consists of wheels which are fastened to the feet and which have suitable mechanisms for driving them ahead by the weight of the rider's body being transferred from one foot to the other. The speed thereby created is considerably greater than walking. The weight of the rider's body presses the platform down, which movement is transferred to the front or driving wheel by a crank acting on chain-wheels. With foot-cycles like this the steering is a matter of considerable importance. In my former patent, No. 687,878, dated December 3, 1901, I provided that the two ends of the axle of the rear or steering wheel rest in slots, thereby enabling the rider to alter the position of the front wheel to the rear wheel to the desired extent, when as a consequence the foot-cycle would turn in the desired direction. In order to reduce the friction thereby caused at the two ends of the axle of said wheel, I provided that same would rest on V-shaped pieces. In spite of this, however, the friction was still so great that the rider had to exert himself considerably to steer. This drawback has been removed by the construction of bearings, as shown in the accompanying drawings. The axle of the rear wheel rests in ball-bearings which are situated in a circular box. Said circular box is situated in a bracket attached to the main frame of the machine and can move backward and forward, as may be required.

In the accompanying drawings, Figure 1 is a side view of a portion of a foot-cycle. Fig. 2 is a side view of the circular boxes with bracket. Fig. 3 is a section taken on line A A of Fig. 2. Fig. 4 is a view of the circular boxes from the back of the foot-cycle, showing the bracket as a section on line B B of Fig. 2.

In frame 1 the front wheel 2 and rear wheel 3 are situated. The front wheel 2 is driven by the weight of the rider's body through the platform 4 being pressed down, acting thereby, through connecting-rod 5, on crank 6 and chain-wheel 7, which latter transfers its movement to the front wheel 2. The platform 4 is again lifted by springs in drum 9 acting on toggle-levers 8, thereby finishing the revolution of the crank. On each side under the frame 1 a bracket 10 is attached, in which the circular box 11 can turn backward and forward. This circular box may consist of a ring, the inside of which forms two ball-bearings, as shown in Fig. 3. On the outer end of said circular box 11 a collar 13 is attached in order to retain the circular box sidewise in bracket 10. It is a matter of the utmost importance that said collar is situated on the outer end or toward the outer end of the circular box, as by being attached on the inner or toward the inner end of the said box a perfect steering of circles is impossible, the bracket locking itself against said inner collar by the twist the rider gives with his foot. On the axle 12 the cones 14 and 15 are situated, thereby completing the ball-bearings in the circular boxes. The nuts 19 retain the cones 14 in their position. Under the frame 1 and in the bracket 10 a piece 16 is attached, which rests with its V-shaped part 17 on the circular boxes 11. The V-shaped part 17 may be situated on the opposite side from that on which it is shown, so that the rider may run very small circles. Foot-cycles provided with such steering mechanism will always run in the desired direction without hardly any exertion of the rider, and the rear wheel will at once come again into a straight line with the front wheel after each turning.

The foot-plate 4 is fitted with fastenings to the legs of the riders.

I claim—

1. In a cycle for the feet, a frame, front and rear wheels, axles for said wheels, circular boxes having ball-bearings therein for the axle of the rear wheel, brackets secured to the frame in which the circular boxes are adapted to roll and a collar on the outer end of each of the circular boxes for preventing longitudinal displacement of the axle, substantially as described.

2. In a cycle for the feet, a frame, a front wheel, a rear wheel, axles therefor, and a circular bearing-box for each end of the rear axle carried in the frame, said box consisting of a ring having a cone-shaped inner face, disks fitting over the ends of the ring, said disks being of cone shape and balls placed between the inclined faces of the cones of the disks and of the ring, substantially as described.

3. In a cycle for the feet, a frame, a front wheel, a rear wheel, axles therefor, circular boxes having ball-bearings for the rear axle, brackets for the boxes secured to the frame and V-shaped bearings secured to said frame and engaging with the upper part of the boxes, said boxes being adapted to have rolling movement in the brackets.

In witness whereof I have hereunto set my hand in presence of two witnesses.

HENRY GLADE.

Witnesses:
BEDLINGTON BODYCOMB,
W. J. S. THOMPSON.